(12) United States Patent
Komatsu

(10) Patent No.: US 11,520,539 B2
(45) Date of Patent: Dec. 6, 2022

(54) INFORMATION PROCESSING APPARATUS OF PROVIDING CRITERIA FOR INTRODUCING PRODUCTS AND NON-TRANSITORY COMPUTER READABLE MEDIUM

(71) Applicant: FUJIFILM Business Innovation Corp., Tokyo (JP)

(72) Inventor: Takashi Komatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 478 days.

(21) Appl. No.: 16/546,313

(22) Filed: Aug. 21, 2019

(65) Prior Publication Data

US 2020/0301627 A1 Sep. 24, 2020

(30) Foreign Application Priority Data

Mar. 20, 2019 (JP) .............................. JP2019-053400

(51) Int. Cl.
*H04N 1/00* (2006.01)
*G06F 3/12* (2006.01)

(52) U.S. Cl.
CPC .......... *G06F 3/1211* (2013.01); *G06F 3/1256* (2013.01); *G06F 3/1294* (2013.01); *H04N 1/00472* (2013.01)

(58) Field of Classification Search
None
See application file for complete search history.

(56) References Cited

U.S. PATENT DOCUMENTS

| 9,646,336 | B2 | 5/2017 | Wang | |
|---|---|---|---|---|
| 2002/0049839 | A1* | 4/2002 | Miida | G06F 3/1285 709/224 |
| 2013/0235428 | A1* | 9/2013 | Ohta | H04N 1/32122 358/1.16 |
| 2014/0118775 | A1* | 5/2014 | Motamed | H04N 1/00042 358/1.15 |
| 2014/0279264 | A1* | 9/2014 | Wang | G06Q 30/0627 705/26.63 |
| 2015/0163121 | A1* | 6/2015 | Mahaffey | G06F 11/3466 707/687 |
| 2015/0178741 | A1* | 6/2015 | Ono | H04N 1/00244 705/7.29 |
| 2016/0216923 | A1* | 7/2016 | Willamowski | H04W 4/021 |

(Continued)

FOREIGN PATENT DOCUMENTS

| JP | 5402445 | 1/2014 |
|---|---|---|
| JP | 2015135663 | 7/2015 |
| JP | 5913800 | 4/2016 |

(Continued)

*Primary Examiner* — Henok Shiferaw
(74) *Attorney, Agent, or Firm* — JCIPRNET

(57) ABSTRACT

An information processing apparatus includes a storage unit that stores history information regarding a use condition of the information processing apparatus to which a product has been introduced, an obtaining unit that obtains, from an external apparatus, analysis information for analyzing the history information, an analysis unit that analyzes the history information by executing the obtained analysis information, and an output unit that outputs an analysis result obtained by executing the analysis information.

18 Claims, 11 Drawing Sheets

(56) References Cited

U.S. PATENT DOCUMENTS

2019/0146728 A1\* 5/2019 Ormond ................ G06Q 40/06
358/1.15

FOREIGN PATENT DOCUMENTS

| JP | 2016057895 | 4/2016 |
| JP | 5970256 | 8/2016 |
| JP | 6244838 | 12/2017 |

\* cited by examiner

| JOB ID | JOB NAME | PRINTING METHOD | SETTING INFORMATION | No. OF PAGES | No. OF COPIES PER PAGE | TOTAL No. OF COPIES |
|---|---|---|---|---|---|---|
| 001 | COPY | DOUBLED-SIDED PRINTING | BLACK-AND-WHITE | 10 | 1 | 10 |
| ... | ... | ... | ... | ... | ... | ... |

511b:

| JOB ID | OPERATION TIME | PROCESSING TIME |
|---|---|---|
| 001 | 5 (SEC) | 2 (MIN) |
| ... | ... | ... |

```
                    QUESTIONNAIRE
522a    1) • • •
             ☐ Yes        ☐ No
        2) • • •
             ☐ Yes        ☐ No
        3) • • •
           ☐ Yes         ☐ No
         522b
                    ANSWER QUESTIONNAIRE — 522c
```

522
522a, 522b, 522c

INFORMATION PROCESSING APPARATUS OF PROVIDING CRITERIA FOR INTRODUCING PRODUCTS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053400 filed Mar. 20, 2019.

BACKGROUND

(i) Technical Field

The present disclosure relates to an information processing apparatus and a non-transitory computer readable medium.

(ii) Related Art

During these years, information processing systems have been proposed that provide business support tools for achieving effective contacts with customers on the basis of the amount of operation of image processing apparatuses that have already been delivered to the customers (e.g., refer to Japanese Unexamined Patent Application Publication No. 2015-135663).

In an information processing system described in Japanese Unexamined Patent Application Publication No. 2015-135663, a server obtains information regarding an operation history of an image processing apparatus and stores the information in a storage medium. The server analyzes the stored information regarding the operation history on the basis of set conditions and, if the information regarding the operation history satisfies the set conditions, generates notification information. The server then stores the notification information in the storage medium and generates, on the basis of the stored notification information, information for displaying a notification screen for notifying a user that the set conditions have been satisfied. The server generates, using the analyzed information regarding the operation history in accordance with an operation performed on the notification screen, information regarding a message to be presented to the user of the image processing apparatus, the message being about the analyzed information regarding the operation history.

SUMMARY

Aspects of non-limiting embodiments of the present disclosure relate to an information processing apparatus and a non-transitory computer readable medium capable of providing criteria for introducing products without outputting history information regarding a use condition of the information processing apparatus to the outside.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a storage unit that stores history information regarding a use condition of the information processing apparatus to which a product has been introduced, an obtaining unit that obtains, from an external apparatus, analysis information for analyzing the history information, an analysis unit that analyzes the history information by executing the obtained analysis information, and an output unit that outputs an analysis result obtained by executing the analysis information.

BRIEF DESCRIPTION OF THE DRAWINGS

Exemplary embodiments of the present disclosure will be described in detail based on the following figures, wherein:

FIG. 2 is a diagram illustrating an example of use condition information;

FIG. 5 is a diagram illustrating an example of a questionnaire screen;

DETAILED DESCRIPTION

Figure 1:
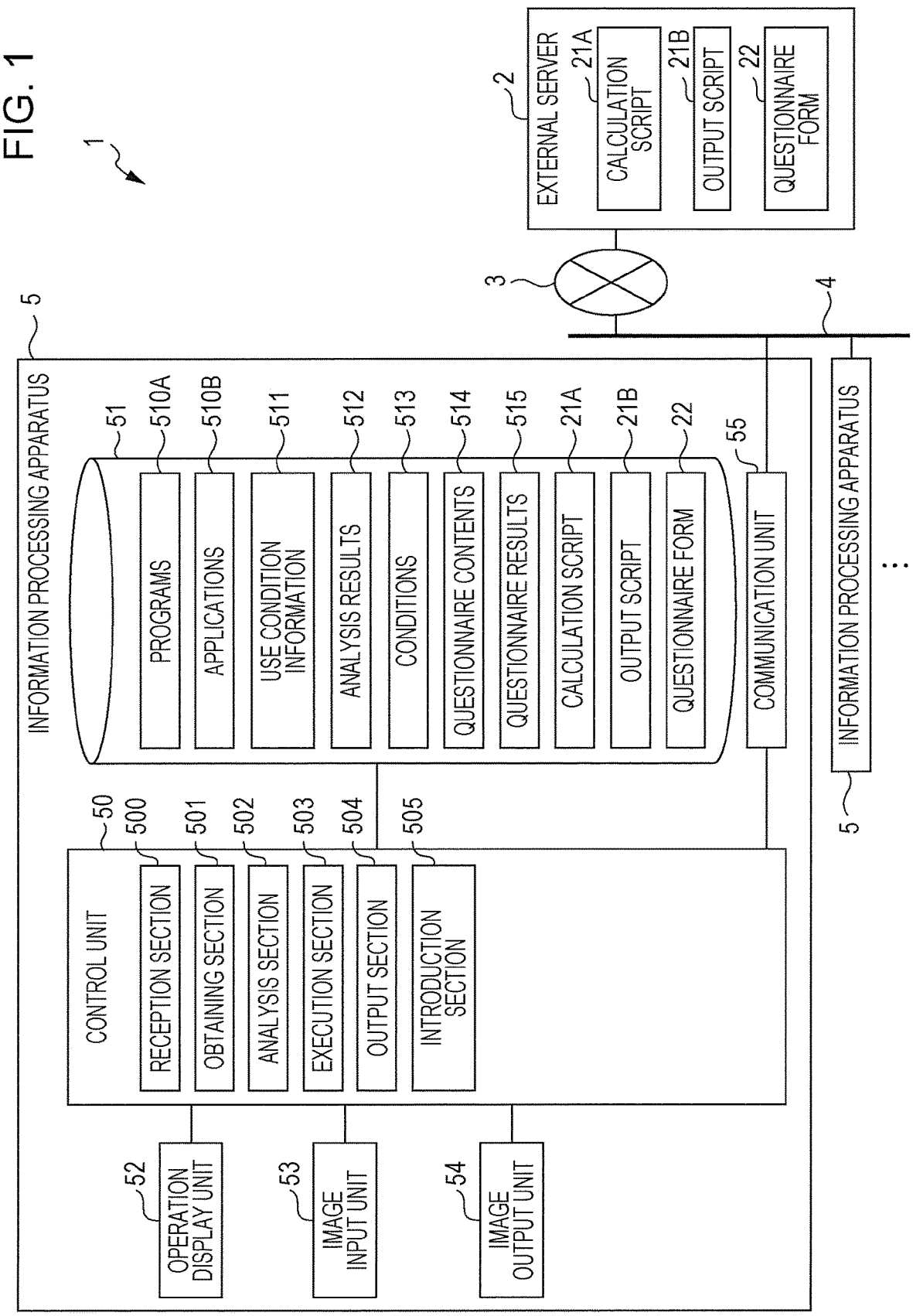
FIG. 1 is a diagram illustrating an example of the configuration of an information processing system according to a first exemplary embodiment of the present disclosure.

Exemplary embodiments of the present disclosure will be described hereinafter with reference to the drawings. Components having substantially the same functions are given the same reference numerals in the drawings, and redundant description thereof is omitted.

SUMMARY OF EXEMPLARY EMBODIMENTS

Information processing apparatuses according to the exemplary embodiments each include a storage unit that stores history information regarding a use condition thereof to which products have been introduced, an obtaining unit that obtains, from an external apparatus, analysis information for analyzing the history information, an analysis unit that analyzes the history information by executing the obtained analysis information, and an output unit that outputs an analysis result obtained by executing the analysis information.

The products are application programs (hereinafter also referred to as "applications"), for example, but may be a combination of application programs and hardware such as a post-processing device, instead. The analysis information includes scripts and, as necessary, data accompanying the scripts, such as a form.

First Exemplary Embodiment

FIG. 1 is a diagram illustrating an example of the configuration of an information processing system 1 according to the first exemplary embodiment of the present disclosure. The information processing system 1 includes an external server 2 and a plurality of information processing apparatuses 5 connected to the external server 2 through an external network 3 and an internal network 4. The external server 2 is an example of an external apparatus.

The external server 2 includes a calculation script 21A, an output script 21B, a questionnaire form 22, and various applications 510B.

The external network 3 is a communication network such as the Internet or a public network. The internal network 4 is a communication network such as an in-house local area network (LAN) or an intranet.

In the present exemplary embodiment, the information processing apparatuses 5 are image forming apparatuses such as multifunction peripherals (MFPs). An MFP has a plurality of functions such as a copy function, a scan function, a print function, a mail function, and a fax function. The information processing apparatuses 5 may be personal computers (PCs), instead.

The information processing apparatuses 5 each include a control unit 50 that controls other components of the information processing apparatus 5, a storage unit 51 that stores various pieces of information, an operation display unit 52, an image input unit 53, an image output unit 54, and a communication unit 55 that performs communication through the internal network 4 and the external network 3. The image input unit 53 is an example of a reading unit. The image output unit 54 is an example of a printing unit.

The image processing apparatus 50 is achieved by a central processing unit (CPU), an interface, and the like. The CPU operates in accordance with programs 510A and the applications 510B to function as a reception section 500, an obtaining section 501, an analysis section 502, an execution section 503, an output section 504, an introduction section 505, and the like. Details of the units 501 to 505 will be described later.

The storage unit 51 is achieved by a read-only memory (ROM), a random-access memory (RAM), a hard disk, and the like. The storage unit 51 stores the applications 510B, the calculation script 21A, the output script 21B, the questionnaire form 22, and the like obtained from the external server 2, as well as the programs 510A, use condition information 511, analysis results 512, conditions 513, questionnaire contents 514, questionnaire results 515, and the like. The use condition information 511 is an example of history information regarding a use condition of the information processing apparatus 5.

The applications 510B are an example of products. The applications 510B are stored in the storage unit 51 in accordance with job names.

The analysis results 512 are obtained by analyzing the use condition information 511 using the analysis section 502.

The conditions 513 include items of estimated results of improvement 521b illustrated in FIG. 4, which will be referred to later, namely, for example, the total number of copies per month, average operation time per job, and average processing time per job.

The questionnaire contents 514 are answers from general users to the questionnaire form 22. The questionnaire contents 514 are stored in the storage unit 51 and associated with user identifiers (IDs).

The questionnaire results 515 are obtained by collecting the questionnaire contents 514.

The operation display unit 52 has a configuration in which, for example, a touch panel overlaps a display such as a liquid crystal display. The operation display unit 52 displays information such as a setting screen on a display screen and receives operations performed by a user on the touch panel.

The image input unit 53 includes a scanner and an automatic document feeder (ADF), for example, and reads an image from a document set on a document platen or a document fed by the ADF.

The image output unit 54 forms an image on a recording medium such as a sheet of paper using electrophotography or an inkjet method, for example, and outputs the recording medium.

The communication unit 55 transmits and receives mail and performs various types of control relating to the internal network 4 and the information processing apparatus 5. The communication unit 55 transmits and receives communication data through the internal network 4 and the external network 3. The communication unit 55 also communicates information with external apparatuses that are not illustrated, such as terminal apparatuses used by the users, through the external network 3 and the internal network 4 by mail, fax, or the like.

FIG. 2 is a diagram illustrating an example of the use condition information 511. The use condition information 511 includes job history information 511a and operation history information 511b. The job history information 511a includes items of "job ID", "job name", "printing method", "setting information", "No. of pages (or images)", "No. of copies per page", and "total No. of copies". "Job ID" is identification information attached to each job. "Job name" is a name indicating a function such as copy, scan, or fax. "Printing method" can be "printing", which indicates printing on one side of sheets, "double-sided printing", which indicates printing on both sides of sheets, "N-up", which indicates printing of N images on one side of sheets, or the like. "Setting information" can be "black-and-white" or another setting value.

The operation history information 511b includes a history of user operations performed using the operation display unit 52 and the image input unit 53. The operation history information 511b includes items of "job ID", "operation time", and "processing time". "Operation time" indicates time taken by the user to perform each operation using the operation display unit 52 or the image input unit 53. "Processing time" indicates time taken by the information processing apparatus 5 to complete processing corresponding to each operation performed by the user.

Next, the units 501 to 504 of the control unit 50 of each information processing apparatus 5 will be described.

The reception section 500 receives a setting of "receive notification about improvement method" as a result of an operation performed by a manager using the operation display unit 52. The setting of "receive notification about improvement method" specifies obtaining and execution of the calculation script 21A and the output script 21B at a time of the reception of the setting or at regular intervals (e.g., an end of a month). The reception section 500 also displays a menu screen 520 on the operation display unit 52 and receives selection of a job name 520a.

The obtaining section 501 accesses the external server 2 in accordance with the setting of "receive notification about improvement method" at a time of reception of the setting or at regular intervals (e.g., the end of the month) and obtains the calculation script 21A and the output script 21B for analyzing the use condition information 511 from the external server 2 through the external network 3, the internal network 4, and the communication unit 55. If there is any piece of information accompanying the calculation script 21A and the output script 21B, the obtaining section 501 also obtains the piece of information. In the present exemplary embodiment, the obtaining section 501 obtains the questionnaire form 22, for example, as accompanying information. The obtaining section 501 stores the obtained calculation script 21A, output script 21B, and questionnaire form 22 in the storage unit 51.

The analysis section 502 calculates proposals 521a and the estimated results of improvement 521b on the basis of the calculation script 21A and stores the proposals 521a and the estimated results of improvement 521b in the storage unit 51 as the analysis results 512. The proposals 521a include, for example, changes to the configuration of the information processing apparatuses 5, an output suppression application for suppressing the number of copies to be printed, and setting values of jobs.

The analysis section 502 also generates the questionnaire results 515 by the user about use of the information processing apparatus 5 recorded in the questionnaire form 22.

The execution section 503 executes a selected job by controlling the image input unit 53, the image output unit 54, and the communication unit 55.

The output section 504 displays or prints a selected output target on the basis of the output script 21B. The output target may be the analysis results 512, the questionnaire form 22, the questionnaire results 515, a report, or the like. If the analysis results 512 satisfy the predetermined conditions 513, the output section 504 outputs the analysis results 512. The output section 504 may output the analysis results 512 by displaying the analysis results 512 on the operation display unit 52 or printing the analysis results 512 using the image output unit 54.

Copies of the questionnaire form 22 as many as the users may be prepared using the image output unit 54 of the information processing apparatus 5, and the image input unit 53 may read the copies on which the users have filled in the questionnaire form 22. Alternatively, the questionnaire form 22 may be transmitted to the terminal apparatuses used by the users and, after the users fill in the questionnaire form 22, sent back from the terminal apparatuses.

The introduction section 505 displays names of recommended applications on the operation display unit 52 on the basis of the proposals 521a illustrated in FIG. 4, which will be referred to later, included in the analysis results 512. The introduction section 505 installs, on the information processing apparatus 5, an application 510B corresponding to a name selected by the manager. When the application 510B is not offered free, the introduction section 505 may introduce the application 510B if an instruction to introduce the application 510B is given after the output section 504 outputs the questionnaire results 515 by the user about use of the information processing apparatus 5. In addition, when a certain period of time has elapsed since the introduction of the application 510B, the use condition information 511 after the introduction of the application 510B may be analyzed using the calculation script 21A and the output script 21B, and results of improvement in an actual use condition may be output.

Operation According to First Exemplary Embodiment

Next, an example of the operation of the information processing system 1 will be described with reference to FIGS. 4 and 5. FIG. 5 is a flowchart illustrating an example of the operation of the information processing apparatus 5.

(1) Assumed Operations

The reception section 500 receives the setting of "receive notification about improvement method" as a result of an operation performed by the manager using the operation display unit 52.

If "receive notification about improvement method" is set, the obtaining section 501 accesses the external server 2 and obtains the calculation script 21A and the output script 21B from the external server 2 through the external network 3, the internal network 4, and the communication unit 55 at a time of the reception of the setting of "receive notification about improvement method" or at regular intervals. The obtaining section 501 stores the obtained calculation script 21A and output script 21B in the storage unit 51.

The analysis section 502 calculates the proposals 521a and the estimated results of improvement 521b on the basis of the calculation script 21A and stores the proposals 521a and the estimated results of improvement 521b in the storage unit 51 as the analysis results 512.

(2) Operations Performed by General User

Figure 5:
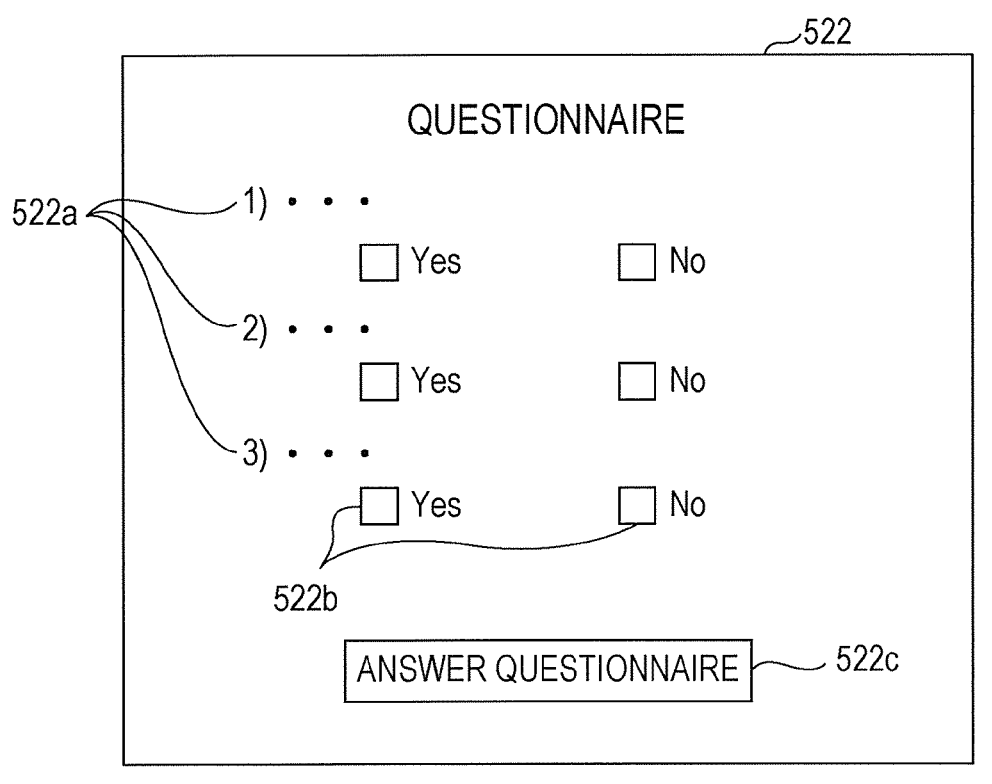
Figure 6:
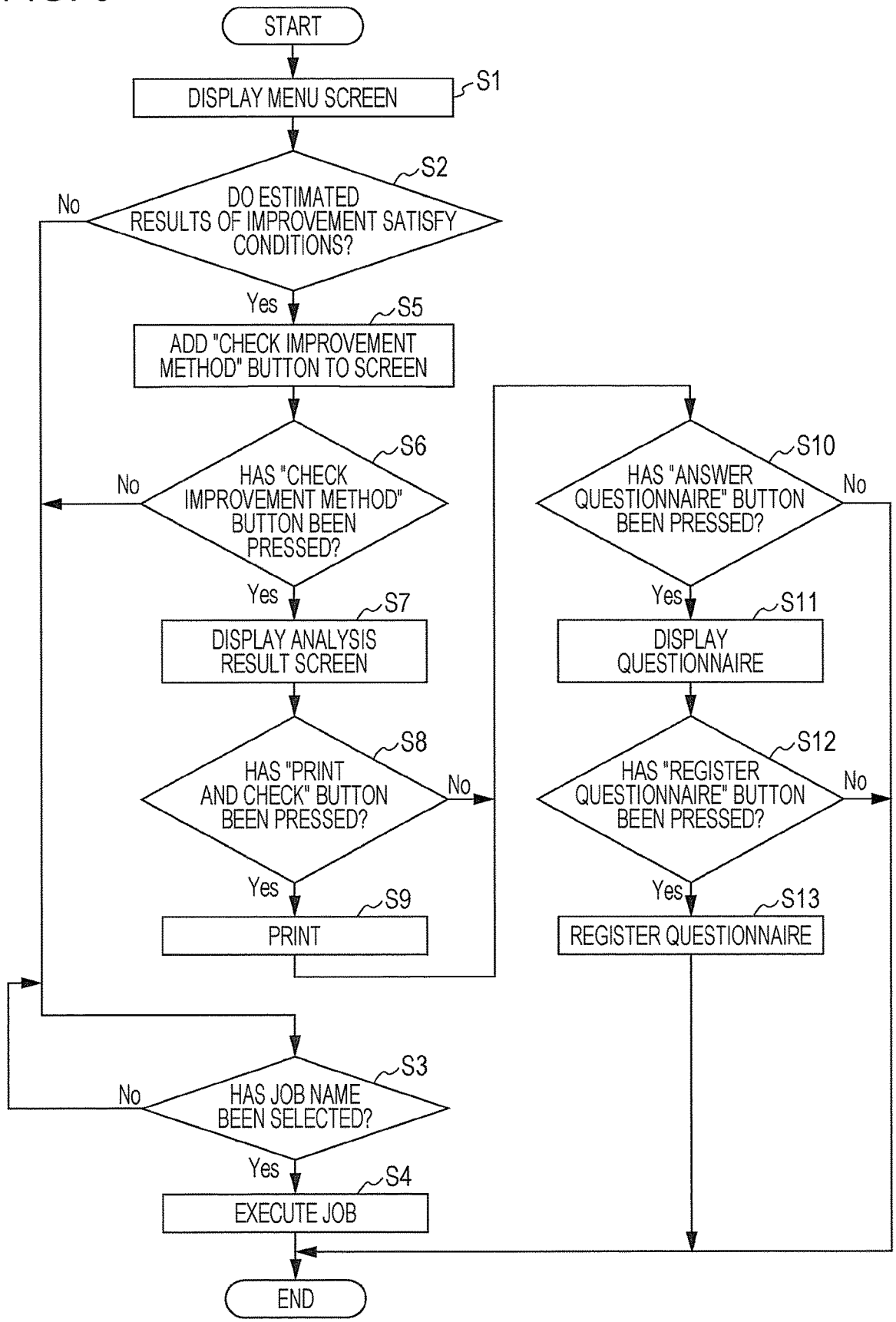
FIG. 6 is a flowchart illustrating an example of the operation of the information processing apparatus at a time when a general user has performed operations.

Next, an example of the operation of the information processing apparatus 5 when a general user has performed operations will be described in accordance with a flowchart of FIG. 6 with reference to FIGS. 3A to 5.

When the general user has activated the information processing apparatus 5, the reception section 500 displays the menu screen 520 on the operation display unit 52 (S1).

Figure 3A:
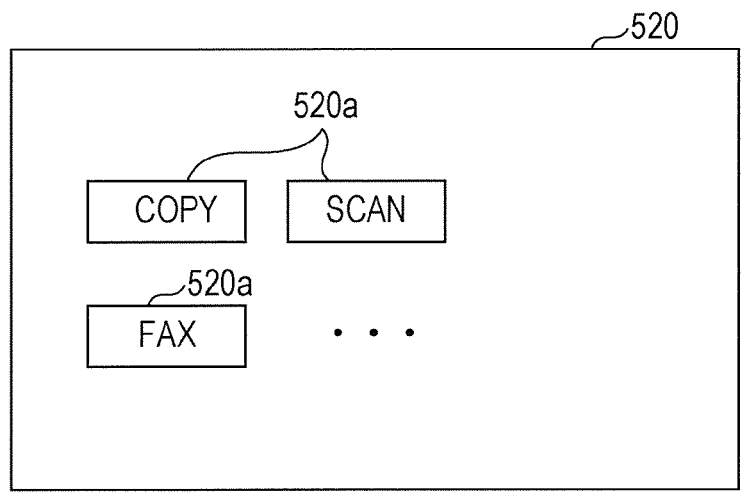
FIG. 3A is a diagram illustrating an example of a menu screen and FIG. 3B is a diagram illustrating an example of the menu screen to which a button has been added.

FIG. 3A is a diagram illustrating an example of the menu screen 520. The menu screen 520 includes job names 520a such as "copy", "scan", and "fax".

The output section 504 determines whether the estimated results of improvement 521b of the analysis results 512 satisfy the conditions 513 (S2). If not (NO in S2), the reception section 500 determines whether any of the job names 520a has been selected (S3). If so (YES in S3), the execution section 503 executes the selected job (S4).

If the estimated results of improvement 521b of the analysis results 512 satisfy the conditions 513 in step S2 (YES in S2), the output section 504 adds a "check improvement method" button 520b to the menu screen 520 (S5).

Figure 3B:
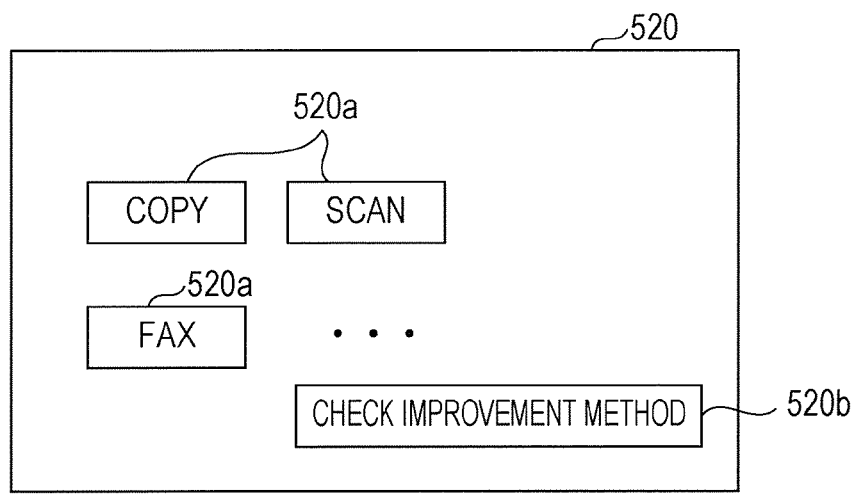

FIG. 3B is a diagram illustrating an example of the menu screen 520 to which the "check improvement method" button 520b has been added. The "check improvement method" button 520b has been added to the menu screen 520. If the general user operates the "check improvement method" button 520b (YES in S6), the output section 504 displays an analysis result screen 521 on the operation display unit 52 (S7).

Figure 4:
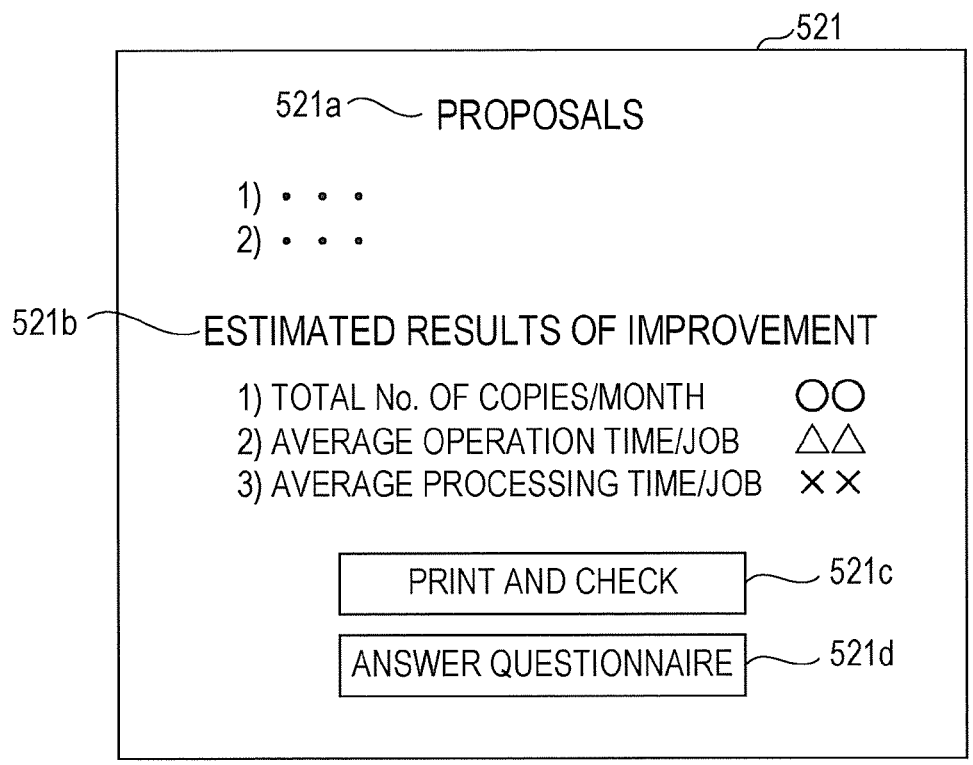
FIG. 4 is a diagram illustrating an example of an analysis result screen.

FIG. 4 is a diagram illustrating an example of the analysis result screen 521. The analysis result screen 521 includes the proposals 521a, the estimated results of improvement 521b, a "print and check" button 521c, and an "answer questionnaire" button 521d. The proposals 521a provide, for example, names of recommended applications. The estimated results of improvement 521b provides information regarding estimated improvements at a time when the proposals 521a have been accepted, namely, for example, the total number of copies per month, average operation time per job, and average processing time per job. The proposals 521a may also include information regarding a proposal and an estimated improvement, "Add X function, and operation time of Y operation will decrease by Z hours". The estimated results of improvement 521b may also include information regarding an estimated improvement, "Output cost per month will decrease by N %".

If the "print and check" button 521c is pressed (YES in S8), the output section 504 prints the analysis results 512 on a sheet using the image output unit 54 and outputs the sheet (S9).

If the "answer questionnaire" button 521d is pressed (YES in S10), the questionnaire form 22 is read from the storage unit 51, and a questionnaire screen 522 is displayed on the operation display unit 52 (S11).

FIG. 5 is a diagram illustrating an example of the questionnaire screen 522. The questionnaire screen 522 includes a plurality of items 522a, checkboxes 522b provided for the items 522a, and a "register questionnaire" button 522c.

The user answers the questionnaire by checking a Yes or No checkbox 522b for each of the items 522a.

If the "register questionnaire" button 522c is pressed (YES in S12), the output section 504 stores the answers to the questionnaire in the storage unit 51 as questionnaire contents 514 and associates the questionnaire contents 514 with a user ID.

(3) Operations Performed by Manager

Next, an example of the operation of the information processing apparatus 5 at a time when the manager has performed operations will be described in accordance with a flowchart of FIG. 10 with reference to FIGS. 7 to 9. Although a case where the manager performs operations will be described here, a service person such as a customer engineer (CE) may perform the operations, instead.

If the manager operates the operation display unit 52 of the information processing apparatus 5 to request a check (S21), the analysis section 502 determines whether the estimated results of improvement 521b of the analysis results 512 satisfy the conditions 513 (S22).

If the estimated results of improvement 521b of the analysis results 512 do not satisfy the conditions 513 (NO in S22), the output section 504 displays, on the operation display unit 52, a message indicating that the estimated results of improvement 521b of the analysis results 512 do not satisfy the conditions 513 (S23). If the estimated results of improvement 521b of the analysis results 512 satisfy the conditions 513 (YES in S22), the output section 504 displays a check screen 523 on the operation display unit 52 (S24).

Figure 7:
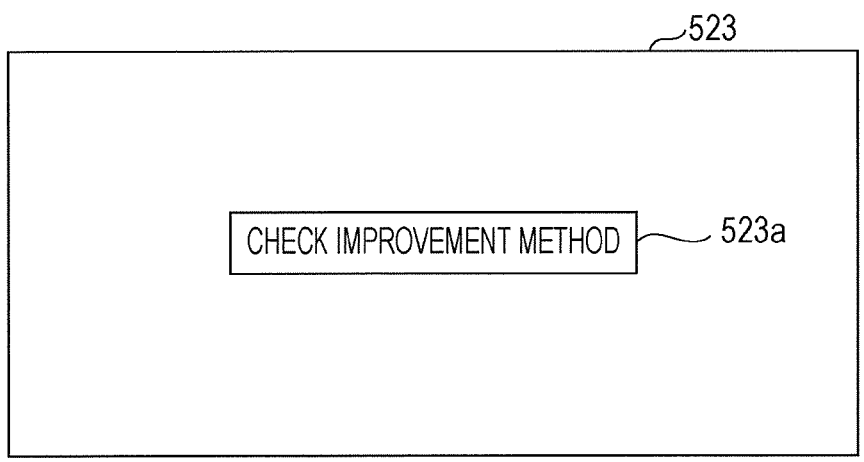
FIG. 7 is a diagram illustrating an example of a check screen.

FIG. 7 is a diagram illustrating an example of the check screen 523. The check screen 523 includes a "check improvement method" button 523a. If the manager operates the "check improvement method" button 523a (YES in S25), the output section 504 displays an analysis result screen 521A on the operation display unit 52 (S26).

Figure 8:
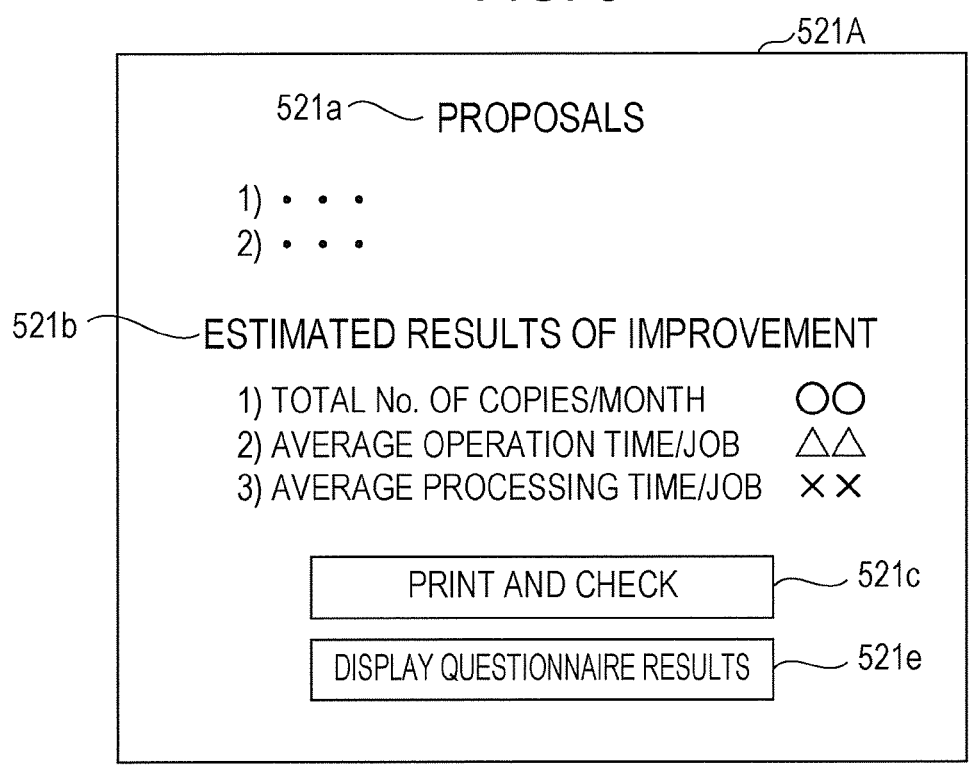
FIG. 8 is a diagram illustrating an example of an analysis result screen.

FIG. 8 is a diagram illustrating an example of the analysis result screen 521A. The analysis result screen 521A includes the proposals 521a, the estimated results of improvement 521b, the "print and check" button 521c, and a "display questionnaire results" button 521e.

If the "print and check" button 521c is pressed (YES in S27), the output section 504 reads the analysis results 512 from the storage unit 51. The output section 504 then prints the analysis results 512 on a sheet using the image output unit 54 and outputs the sheet (S28).

If the "display questionnaire results" button 521e is pressed (YES in S29), the output section 504 generates questionnaire results 515 by collecting the questionnaire contents 514 stored in the storage unit 51 and stores the questionnaire results 515 in the storage unit 51. The output section 504 then displays a questionnaire result screen 525 on the operation display unit 52 (S30).

Figure 9:
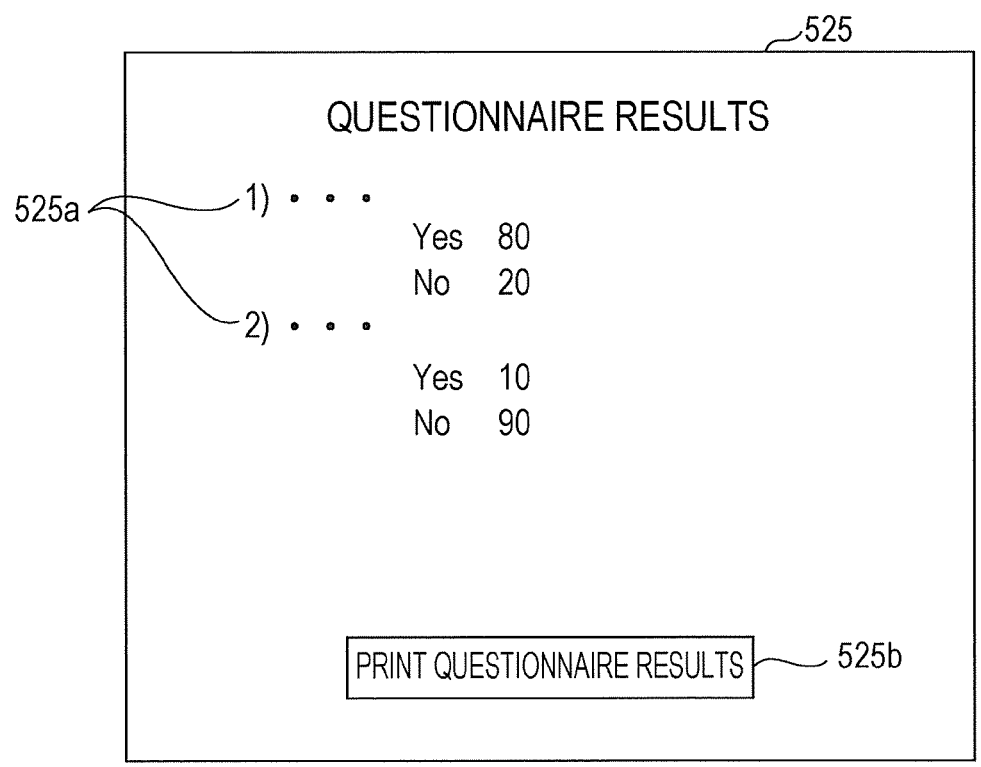
FIG. 9 is a diagram illustrating an example of a questionnaire result screen.
Figure 10:
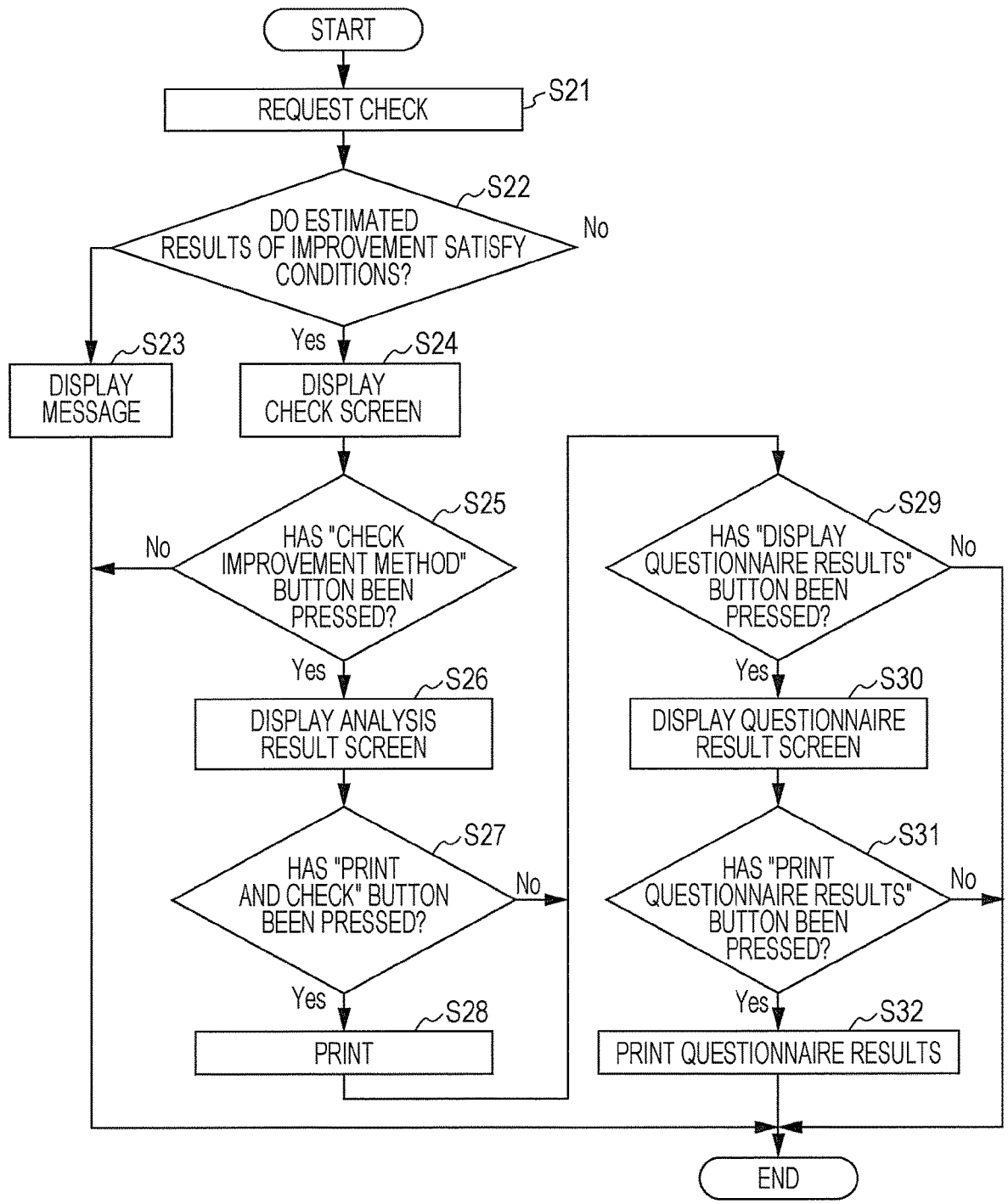
FIG. 10 is a flowchart illustrating an example of the operation of the information processing apparatus at a time when a manager has performed operations.

FIG. 9 is a diagram illustrating an example of the questionnaire result screen 525. The questionnaire result screen 525 includes a plurality of items 525a and a "print questionnaire results" button 525b. The total number of users who have selected "Yes" and the total number of users who have selected "No" are provided for each of the items 525a.

If the "print questionnaire results" button 525c is pressed (YES in S31), the output section 504 prints the questionnaire results 515 stored in the storage unit 51 onto a sheet using the image output unit 54 and outputs the sheet (S32).

Second Exemplary Embodiment

Figure 11:
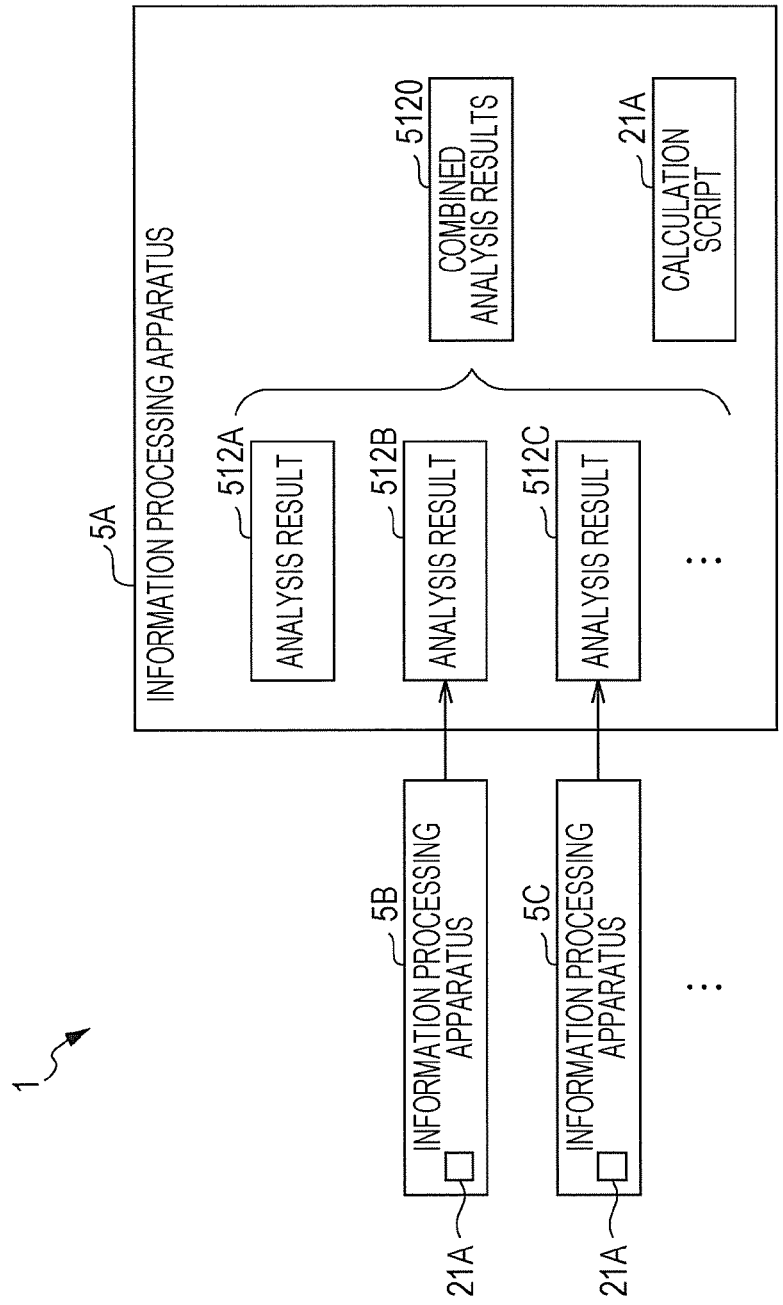
FIG. 11 is a block diagram illustrating a relevant part of an information processing system according to a second exemplary embodiment of the present disclosure.

FIG. 11 is a block diagram illustrating a relevant part of an information processing system 1 according to a second exemplary embodiment of the present disclosure. In the first exemplary embodiment, each of the information processing apparatuses 5 outputs the analysis results 512. In the information processing system 1 according to the present exemplary embodiment, on the other hand, an output section 504 of a single information processing apparatus 5A outputs combined analysis results 5210, which are obtained by combining together an analysis result 512A from the information processing apparatus 5A and analysis results 512B, 512C, and the like from other information processing apparatuses 5B, 5C, and the like.

In this case, the information processing apparatuses 5B, 5C, and the like may each obtain the calculation script 21A from the external server 2 and then obtain the analysis results 512B, 512C, and the like, respectively, on the basis of the calculation script 21A. Alternatively, the calculation script 21A obtained by the information processing apparatus 5A may be transmitted to the information processing apparatuses 5B, 5C, and the like for analyses.

The obtaining section 501 of the information processing apparatus 5A obtains the analysis results 512B, 512C, and the like from the information processing apparatuses 5B, 5C, and the like, respectively.

The output section 504 of the information processing apparatus 5A outputs the combined analysis results 5120, which are obtained by combining together the analysis results 512A, 512B, 512C, and the like.

Third Exemplary Embodiment

Figure 12:
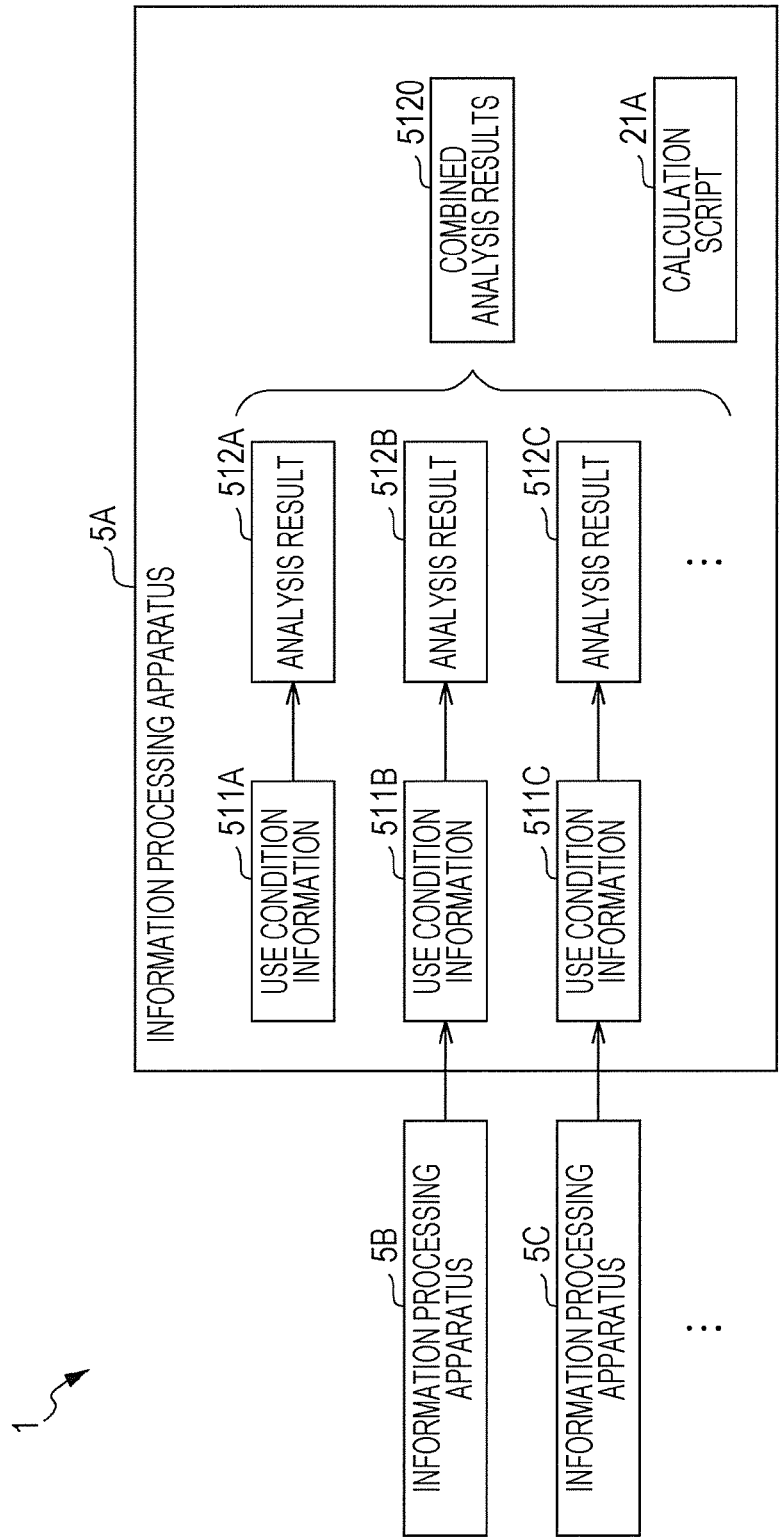
FIG. 12 is a block diagram illustrating a relevant part of an information processing system according to a third exemplary embodiment of the present disclosure.

FIG. 12 is a block diagram illustrating a relevant part of an information processing system 1 according to a third exemplary embodiment of the present disclosure. In the first exemplary embodiment, each of the information processing apparatuses 5 outputs the analysis results 512. In the present exemplary embodiment, on the other hand, a single information processing apparatus 5A obtains use condition information 5118, 511C, and the like from other information processing apparatuses 5B, 5C, and the like, respectively. The information processing apparatus 5A then outputs combined analysis results 5210, which are obtained by combining together analysis results 512A, 512B, 512C, and the like obtained by analyzing the use condition information 511A, 511B, 511C, and the like, respectively, using the calculation script 21A obtained thereby.

"Receive notification about improvement method" is set only for the information processing apparatus 5A. The obtaining section 501 of the information processing apparatus 5A has obtained the calculation script 21A and the like from the external server 2. The obtaining section 501 of the information processing apparatus 5A also obtains the use condition information 511B, 511C, and the like from the information processing apparatuses 5B, 5C, and the like, respectively.

The analysis section 502 of the information processing apparatus 5A obtains the analysis results 512A, 512B, 512C, and the like, which are obtained by analyzing the use condition information 511A, 511B, 511C, and the like, respectively, using the calculation script 21A obtained by the information processing apparatus 5A.

The output section 504 of the information processing apparatus 5A outputs the combined analysis results 5120, which are obtained by combining together the analysis results 512A, 512B, 512C, and the like.

Although some exemplary embodiments of the present disclosure have been described, exemplary embodiments of the present disclosure are not limited to those described above. The above exemplary embodiments may be modified in various ways without deviating from the scope of the present disclosure.

The components of the control unit 50 may each be partially or entirely achieved by a hardware circuit such as a field-programmable gate array (FPGA) or an application-specific integrated circuit (ASIC).

In addition, the components according to the above exemplary embodiments may be omitted or modified without deviating from the scope of the present disclosure.

In addition, steps may be added, removed, modified, or switched in the flowcharts referred to in the above exemplary embodiments without deviating from the scope of the present disclosure. In addition, the programs used in the above exemplary embodiments may be stored in a computer readable medium such as a compact disc read-only memory (CD-ROM) and provided. In addition, the programs used in the above exemplary embodiments may be stored in an external server such as a cloud server and used through a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory that stores history information regarding a use condition of the information processing apparatus to which a product has been introduced;
a central processing unit that obtains, from an external apparatus, analysis information for analyzing the history information;
the central processing unit analyzes the history information by executing the obtained analysis information; and
the central processing unit outputs an analysis result obtained by executing the analysis information,
wherein the central processing unit obtains a questionnaire form from the external apparatus, and
wherein the central processing unit generates a questionnaire result by a user about use of the information processing apparatus, the questionnaire result being recorded on the questionnaire form,
wherein the central processing unit introduces, to the information processing apparatus, a product different from the foregoing product on a basis of the questionnaire result.

2. The information processing apparatus according to claim 1,
wherein the central processing unit outputs the analysis result if the analysis result satisfies a predetermined condition.

3. The information processing apparatus according to claim 1,
wherein the central processing unit prints the questionnaire form on a sheet and reads the sheet on which the user has filled in the questionnaire form.

4. The information processing apparatus according to claim 2,
wherein the central processing unit prints the questionnaire form on a sheet and reads the sheet on which the user has filled in the questionnaire form.

5. The information processing apparatus according to claim 1,
wherein the central processing unit displays the questionnaire form and the user fills in the questionnaire form.

6. The information processing apparatus according to claim 2,
wherein the central processing unit displays the questionnaire form and the user fills in the questionnaire form.

7. The information processing apparatus according to claim 1,
wherein the questionnaire form is transmitted to a terminal apparatus used by the user and, after the user fills in the questionnaire form, sent back from the terminal apparatus.

8. The information processing apparatus according to claim 2,
wherein the questionnaire form is transmitted to a terminal apparatus used by the user and, after the user fills in the questionnaire form, sent back from the terminal apparatus.

9. The information processing apparatus according to claim 1,
wherein the central processing unit an introduction unit that, if a first product, which is offered free, is selected on a basis of the analysis result, introduces the first product to the information processing apparatus.

10. The information processing apparatus according to claim 2,
wherein the central processing unit an introduction unit that, if a first product, which is offered free, is selected on a basis of the analysis result, introduces the first product to the information processing apparatus.

11. The information processing apparatus according to claim 9,
wherein, if a second product, which is not offered free, is selected on the basis of the analysis result, and if an instruction to introduce the second product is given after outputting a questionnaire result by a user about use of the information processing apparatus, the central processing unit introduces the second product.

12. The information processing apparatus according to claim 10,
wherein, if a second product, which is not offered free, is selected on the basis of the analysis result, and if an instruction to introduce the second product is given after outputting a questionnaire result by a user about use of the information processing apparatus, the central processing unit introduces the second product.

13. The information processing apparatus according to claim 1,
wherein the central processing unit obtains an analysis result of history information regarding another apparatus, and
wherein the central processing unit outputs analysis results obtained by combining together the analysis result of the history information regarding the information processing apparatus, which has been obtained by executing the analysis information, and the analysis result of the history information regarding the other apparatus.

14. The information processing apparatus according to claim 2,
wherein the central processing unit obtains an analysis result of history information regarding another apparatus, and
wherein the central processing unit outputs analysis results obtained by combining together the analysis result of the history information regarding the information processing apparatus, which has been obtained by executing the analysis information, and the analysis result of the history information regarding the other apparatus.

15. The information processing apparatus according to claim 13,
wherein the central processing unit transmits the analysis information to the other apparatus, and
wherein the central processing unit outputs analysis results obtained by combining together the analysis result of the history information regarding the information processing apparatus, which has been obtained by executing the analysis information, and the analysis result of the history information regarding the other apparatus, which has been obtained by executing analysis information.

16. The information processing apparatus according to claim 13,
wherein the central processing unit obtains the history information from the other apparatus, and
wherein the central processing unit outputs analysis results obtained by combining together the analysis result of the history information regarding the information processing apparatus, which has been obtained by executing the analysis information, and an analysis result of the history information regarding the other apparatus, which has been obtained by executing the analysis information for the history information obtained from the other apparatus.

17. A non-transitory computer readable medium storing a program causing a central processing unit of a computer including a memory that stores history information regarding a use condition of the computer to:
obtaining, from an external apparatus, analysis information for analyzing the history information;
analyzing the history information by executing the obtained analysis information;
outputting an analysis result of the history information obtained by executing the analysis information;
obtaining a questionnaire form from the external apparatus;
generating a questionnaire result by a user about use of the computer, the questionnaire result being recorded on the questionnaire form; and
wherein the central processing unit introduces, to the computer, a product different from the foregoing product on a basis of the questionnaire result.

18. An information processing apparatus comprising:
storage means for storing history information regarding a use condition of the information processing apparatus to which a product has been introduced;
obtaining means for obtaining, from an external apparatus, analysis information for analyzing the history information and obtaining a questionnaire form from the external apparatus;
analysis means for analyzing the history information by executing the obtained analysis information and generating a questionnaire result by a user about use of the information processing apparatus, the questionnaire result being recorded on the questionnaire form;
output means for outputting an analysis result obtained by executing the analysis information; and
introduction means for introducing, to the information processing apparatus, a product different from the foregoing product on a basis of the questionnaire result.

\* \* \* \* \*